Dec. 8, 1931.   L. F. FOUGSTEDT ET AL   1,835,293
ASPARAGUS CUTTER
Filed June 10, 1930

INVENTORS
LOUIS F. FOUGSTEDT
JOHN J. BJORK
BY
Ezekiel Wolf
ATTORNEY

Patented Dec. 8, 1931

1,835,293

UNITED STATES PATENT OFFICE

LOUIS F. FOUGSTEDT, OF BEDFORD, AND JOHN J. BJORK, OF MEDFORD, MASSACHUSETTS

ASPARAGUS CUTTER

Application filed June 10, 1930. Serial No. 460,127.

The present invention relates to improvements in asparagus cutters, and in particular to asparagus cutters which can be used by a person without bending over when cutting asparagus.

While devices of this nature have previously been constructed, they have been rather difficult to operate, due particularly to the lack of a proper construction of the device. In some of these devices the knife to cut the asparagus stalk and the prongs to grasp the asparagus, are both controlled by a trigger near the handle of the asparagus cutter. This device requires considerable skill to operate since the operator has no place to rest the cutter while pulling the handle, and also because the device must be very long to be used in an upright position.

In the present invention, the asparagus is cut by the operator thrusting the knife at the end of the cutter through the asparagus stalk just below the ground in such a position that the stalk above the ground comes between the jaws of the tongs which may then be operated to grip the asparagus stalk without crushing it. One of the features of the present device is that the cutting knife is aligned with the rod of the cutter and a straight thrust is all that is necessary to pierce the asparagus stalk. Instead of cutting the stalk horizontally, in the present device the stalk is cut obliquely, and therefore diminishes the tendency of the stalk to bend while it is being cut.

A further feature of the present device is that the prongs are directly operated by the handle or trigger in the same way and grip evenly the asparagus stalks.

Further improvements will be noted from the construction and operation of the present invention described in connection with the accompanying drawings, in which:—

Figures 1, 2:
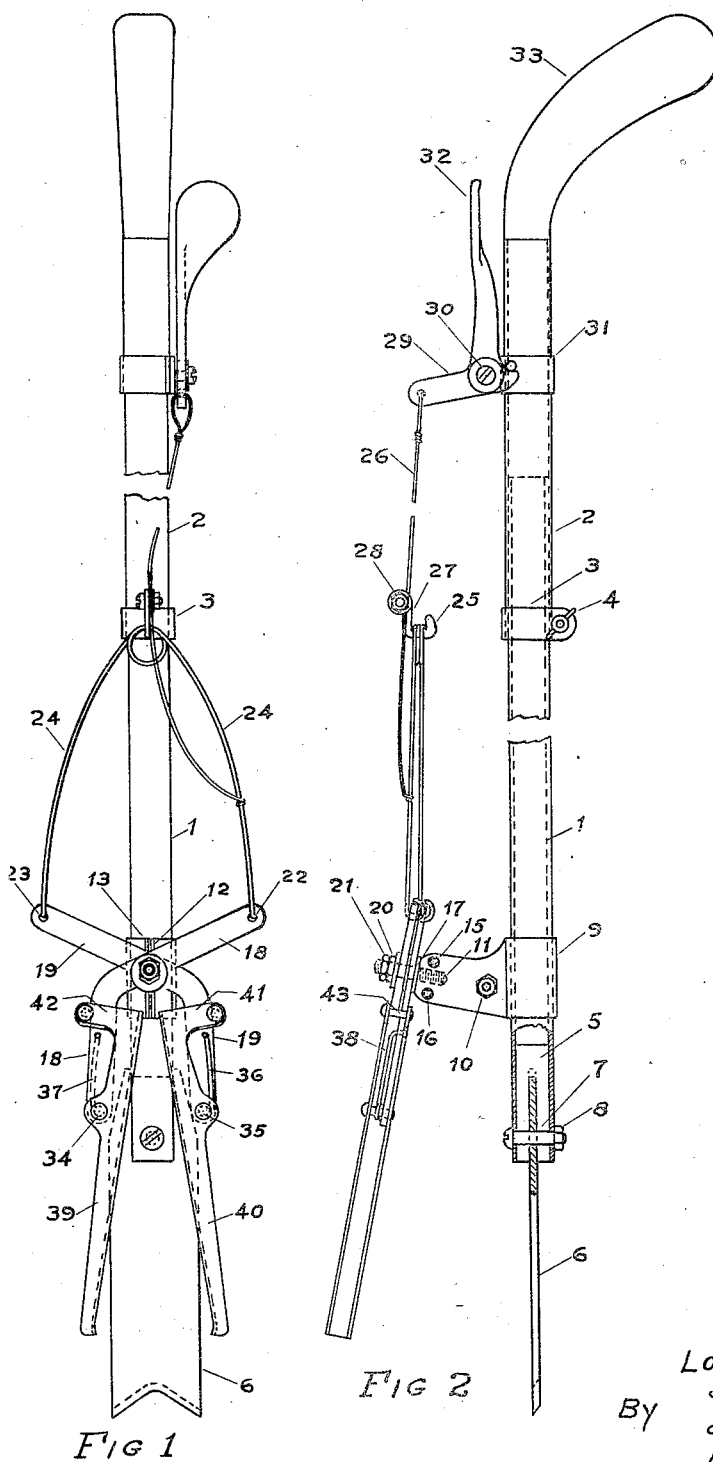
Figure 1 shows a longitudinal view of the cutter.
Figure 2 shows a side view of the cutter as shown in Figure 1.

An aluminum tube 1 is provided at the upper end of which is a second tube 2 fitting over the tube 1. A clamp 3 is provided having a clamping nut 4 in order to clamp the two telescope tubes 1 and 2 together. This construction allows the rod to be adjusted to the proper length as suited for the operator. At the lower end of the tube 1, which is preferably made of aluminum, as is the tube 2, there is a wooden insert 5, in which the asparagus knife 6 sets, the insert 5 and the knife 6 are held in place by the bolt 7 and nut 8. A collar 9 is provided at the lower end of the rod 1, near the knife 6 for supporting the tongs gripping the asparagus stalks when the asparagus is cut. This collar 9 is adjustable along the rod 1, by means of the bolt and nut 10. The collar 9 carries the bearing 11 threaded into the extension of the collar 9, between the two sides of the collar 12 and 13, as indicated in Figure 1. This bearing 11 is threaded by the two sides 12 and 13 of the collar 9 being pressed and riveted together by rivets 15 and 16. The bearing 11 is fitted with a washer 17 on which rests the arms 18 and 19 of the gripping device. The bearing 11 passes through the hole in the arms 18 and 19, and the arms 18 and 19 are held like scissors arms by the nut 20 and locknut 21. At the upper ends of the arms 18 and 19 are holes 22 and 23, through which is inserted the wire 24 which is looped about the hook 25 as indicated in Figure 2. The hook 25 is supported by means of the wire 26 to which the hook is clamped. The wire 26 passing through a groove in the plate 27 carries the hook 25 in which plate the wire is clamped by means of the bolt and nut 28. The wire at the lower end is looped about one branch of the wire 24, as clearly shown in the figures. At the upper end, the wire 26 passes through an eye in the lever 29 which is pivoted at 30 to a collar 31 attached to the rod 2. The lever 29 is in the shape of a bell crank lever and is provided with a thumb support 32 adjacent the handle 33. The gripping tongs 39 and 40 for gripping the asparagus are attached by being pivoted to the lower ends of the arms 18 and 19 at 34 and 35 respectively. These tongs are made of aluminum and channel shaped, and may be pressed from flat material by bending backwards the outer parts of a flat piece of metal. Springs 36 and 37 are provided passing around the pivots 34 and 35 and pressing against the inner wall of the channel as indicated by 38 in Figure 2 to keep the ends of the jaws 39 and 40 apart. The jaws 39 and 40 have sides 41 and 42 across which the rods 43 are riveted to keep the jaws from flying out further than a given distance.

The device is used in the following way:

The operator, gripping the handle 33, thrusts the knife 6 diagonally through the asparagus stalks. The knife being V shaped as indicated in Figure 1, tends to cut the stalk if it comes within the outer points of the V. The operator then presses the thumb rest 32, and thereby raises the other end lever 29, thus pulling together the upper ends of the arms 18 and 19. Since this action is obtained through the wire 24, there is a considerable amount of give in closing the jaws, 39 and 40. Further as the jaws 39 and 40 are lightly spring tensioned by the springs 36 and 37, the jaws 39 and 40, do not grasp the asparagus any tighter than necessary to hold it. This yielding method of operating the jaws 39 and 40 through the spring tensioned wire 24, allows the operator to disregard entirely how hard he is pressing the thumb rest 32.

The whole apparatus is adjustable, so that either a tall person or a short person may use it. The rod may be lengthened by pulling out the telescope tube 2. In such a case the wire 26 may be let out and clamped in a position nearer its lower end.

As the knife 6 becomes shorter through sharpening, the collar 9 may be raised, thus setting back the jaws 39 and 40. Likewise the collar 31 may be adjusted on the rod 32. When it is desired the knife 6 may be removed for replacement. The operation of both jaws 39 and 40, as the handle 32 is pressed allows the asparagus stalk to be gripped symmetrically with the cutting position of the knife regardless of the size of the stalk. The device is particularly easy to operate, as when the operator is picking up the stalk the end of the device is supported on the ground, and thus exerts no strain on his hand. In actual use, the device has been used steadily for many hours without tiring the operator's arms and hands.

It will be noted that the jaws 39 and 40 are positioned near the knife 6, and inclined to the knife and the rod 1 at a slight angle.

Having now described our invention, we claim:

1. An asparagus cutter comprising an elongated staff having a knife attached to the end thereof and aligned therewith and means adjacent thereof positioned at a slight inclination with said staff for yieldingly holding the asparagus stalk, and means adjacent the opposite end of the staff for operating the same, means for adjusting the length of said staff and means for adjusting the operating means.

2. An asparagus cutter having an elongated staff, a V shaped knife attached to the end thereof, and a pair of tongs mounted symmetrically with said V and inclined at an angle therewith, and means operated from the opposite end of said staff for yieldingly operating said tongs.

3. An asparagus cutter having an elongated staff, a V shaped knife attached to the end thereof, and a pair of tongs mounted symmetrically with said V comprising a plurality of symmetrically pivoted arms, each of said arms having jaws yieldingly pivoted thereon and means for operating said tongs controlled from adjacent the opposite ends of the staff.

4. An asparagus cutter comprising a staff, a knife attached to the end of the staff, a pair of tongs, means for adjustably mounting said tongs near the knife end of the staff, and yielding means for operating said tongs including operating means adjacent the opposite end of the staff and adjustable connecting means connecting said tongs and said operating means.

5. An asparagus cutter comprising a staff, a knife attached to the end of the staff and substantially aligned with the same, a pair of tongs positioned and operating in a plane having a slight inclination with the staff at the knife end, and means for yieldingly operating said tongs from adjacent the opposite end of said staff.

6. An asparagus cutter, comprising a staff, a knife attached to the end of the staff, and aligned with the same, a pair of tongs positioned and operating in a plane having a slight inclination with the staff at the knife end, and means for yieldingly operating said tongs adjacent the opposite end of said staff comprising a wire loop attached to the operating end of said tongs and means including a lever pivoted on said staff and connected to the center of the loop for operating the same.

7. An asparagus cutter comprising a staff, a knife attached to the end of the staff, a collar adjustably positioned near the knife end of the staff, a pair of symmetrically operating tongs, means for pivoting said tongs in said collar, yielding means for operating said tongs, comprising a yielding wire loop having its ends attached to the tong operating ends including an operating lever mounted adjacent the staff, and adjustable connecting means connecting to said operating lever at one end and the center of said loop at the other end.

LOUIS F. FOUGSTEDT.
JOHN J. BJORK.